(12) United States Patent
Wang et al.

(10) Patent No.: US 11,294,856 B2
(45) Date of Patent: Apr. 5, 2022

(54) METHOD, DEVICE, AND COMPUTER PROGRAM PRODUCT FOR DELETING SNAPSHOTS

(71) Applicant: EMC IP Holding Company LLC, Hopkinton, MA (US)

(72) Inventors: Fei Wang, Chengdu (CN); Changxu Jiang, Chengdu (CN)

(73) Assignee: EMC IP Holding Company LLC, Hopkinton, MA (US)

(*) Notice: Subject to any disclaimer, the term of this patent is extended or adjusted under 35 U.S.C. 154(b) by 200 days.

(21) Appl. No.: 16/656,770

(22) Filed: Oct. 18, 2019

(65) Prior Publication Data
US 2020/0133920 A1  Apr. 30, 2020

(30) Foreign Application Priority Data
Oct. 31, 2018 (CN) .......................... 201811291340.9

(51) Int. Cl.
*G06F 16/11* (2019.01)

(52) U.S. Cl.
CPC ................. *G06F 16/128* (2019.01)

(58) Field of Classification Search
None
See application file for complete search history.

(56) References Cited

U.S. PATENT DOCUMENTS

| | | | |
|---|---|---|---|
| 7,577,817 B2 | 8/2009 | Karpoff et al. | |
| 7,941,632 B2 | 5/2011 | Karpoff et al. | |
| 7,953,819 B2 | 5/2011 | Liang et al. | |
| 8,032,498 B1 | 10/2011 | Armangau et al. | |
| 8,412,688 B1 | 4/2013 | Armangau et al. | |
| 10,146,782 B1 | 12/2018 | Bono et al. | |
| 10,216,757 B1 | 2/2019 | Armangau et al. | |
| 10,242,011 B1 | 3/2019 | Basov et al. | |
| 10,242,012 B1 | 3/2019 | Basov et al. | |
| 10,261,944 B1 | 4/2019 | Armangau et al. | |
| 10,387,369 B1 | 8/2019 | Davenport et al. | |
| 10,809,932 B1 | 10/2020 | Armangau et al. | |
| 11,100,047 B2 | 8/2021 | Lv et al. | |
| 2007/0198605 A1* | 8/2007 | Saika | G06F 16/128 |
| 2014/0081911 A1* | 3/2014 | Deshpande | G06F 3/067 707/610 |

(Continued)

*Primary Examiner* — Irene Baker
(74) *Attorney, Agent, or Firm* — BainwoodHuang

(57) ABSTRACT

Techniques perform snapshot deletion. Such techniques involve: determining an object associated with a to-be-executed snapshot deletion request in a snapshot deletion request list of a storage system; in response to the object being included in a predefined set of objects, determining information associated with the to-be-executed snapshot deletion request, the information including at least one of: a number of snapshot deletion requests in the snapshot deletion request list which correspond to snapshots associated with the object, and a waiting time of the to-be-executed snapshot deletion request in the snapshot deletion request list; determining, based on the information and from the snapshot deletion request list, a set of snapshot deletion requests associated with the object; and deleting snapshots corresponding to snapshot deletion requests in the set. Accordingly, the performance of snapshot deletion operations may be improved without any impact on other service on the storage system.

20 Claims, 5 Drawing Sheets

(56) References Cited

U.S. PATENT DOCUMENTS

2014/0149353 A1* 5/2014 Lee .................. G06F 16/174
                                                707/639
2020/0019620 A1* 1/2020 Sarda ................ G06F 16/113

* cited by examiner

METHOD, DEVICE, AND COMPUTER PROGRAM PRODUCT FOR DELETING SNAPSHOTS

CROSS-REFERENCE TO RELATED APPLICATION

This application claims priority to Chinese Patent Application No. CN201811291340.9, on file at the China National Intellectual Property Administration (CNIPA), having a filing date of Oct. 31, 2018, and having "METHOD, DEVICE, AND COMPUTE PROGRAM PRODUCT FOR DELETING SNAPSHOTS" as a title, the contents and teachings of which are herein incorporated by reference in their entirety.

FIELD

Embodiments of the present disclosure generally relate to the field of data storage, and more specifically, to a method, device, and computer program product for snapshot deletion.

BACKGROUND

Snapshot is commonly used in storage systems as one data protection method. The storage system may maintain storage space and allocate storage blocks for storing snapshots. Snapshots are created for storage objects (abbreviated as objects), and these objects may include, for example, logical unit devices, file systems, data repositories, etc. One storage system may include a plurality of objects, and a plurality of objects may be created for one object. Therefore, there may co-exist a plurality of snapshots for the same object at the same time.

As time goes on, snapshots should be deleted to release space. Since a customer might delete multiple snapshots once for the same object, in the storage system, sometimes multiple snapshot deletion requests for multiple snapshots for the same object will be aggregated together to enhance the performance of snapshot deletion. However, the performance of snapshot deletion is not optimal in current storage systems that relate to snapshots. Even though aggregate snapshot deletion can help improve the efficiency when these deletion requests are aimed at the same storage resource object, multiple snapshot deletion requests to be processed are from various objects in most storage systems. Those snapshot deletion requests are full of variety and disorder and are queued to be executed by processors. Since aggregate snapshot deletion only works when the snapshots being processed are aimed at the same storage object, the performance of snapshot deletion is still limited. Meanwhile, when the storage system is configured with thousands of objects, since snapshot deletion is a lengthy process, there may exist many snapshots that are being deleted, and further storage space for storing snapshots cannot be released in time.

SUMMARY

Embodiments of the present disclosure provide a method, device, and computer program product for snapshot deletion.

In a first aspect of the present disclosure, provided is a method for snapshot deletion. The method includes: determining an object associated with a to-be-executed snapshot deletion request in a snapshot deletion request list of a storage system; in response to the object being included in a predefined set of objects, determining information associated with the to-be-executed snapshot deletion request, the information including at least one of: a number of snapshot deletion requests in the snapshot deletion request list which correspond to snapshots associated with the object, and a waiting time of the to-be-executed snapshot deletion request in the snapshot deletion request list; determining, based on the information and from the snapshot deletion request list, a set of snapshot deletion requests associated with the object; and deleting snapshots corresponding to snapshot deletion requests in the set.

In a second aspect of the present disclosure, provided is a device for managing a storage system. The device includes: at least one processing unit; at least one memory coupled to the at least one processing unit and storing instructions to be executed by the at least one processing unit, the instructions, when being executed by the at least one processing unit, causing the device to perform acts including: determining an object associated with a to-be-executed snapshot deletion request in a snapshot deletion request list of a storage system; in response to the object being included in a predefined set of objects, determining information associated with the to-be-executed snapshot deletion request, the information including at least one of: a number of snapshot deletion requests in the snapshot deletion request list which correspond to snapshots associated with the object, and a waiting time of the to-be-executed snapshot deletion request in the snapshot deletion request list; determining, based on the information and from the snapshot deletion request list, a set of snapshot deletion requests associated with the object; and deleting snapshots corresponding to snapshot deletion requests in the set.

In a third aspect of the present disclosure, provided is a computer program product. The computer program product is tangibly stored on a non-transient computer readable medium and including machine executable instructions which, when being executed, causing a machine to perform steps of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objects, features, and advantages of the present disclosure will become more apparent, wherein the same reference numerals typically represent the same components in the example embodiments of the present disclosure.

Throughout the figures, the same or corresponding numerals denote the same or corresponding parts.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Some preferable embodiments will be described in more detail with reference to the accompanying drawings, in which the preferable embodiments of the present disclosure have been illustrated. However, the present disclosure can be implemented in various manners, and thus should not be construed to be limited to embodiments disclosed herein. On the contrary, those embodiments are provided for the thorough and complete understanding of the present disclosure, and completely conveying the scope of the present disclosure to those skilled in the art.

The terms "comprise" and its variants used here are to be read as open terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

As described in the BACKGROUND, the performance of snapshot deletion is not optimal in current storage systems that relate to snapshots.

Figure 1:
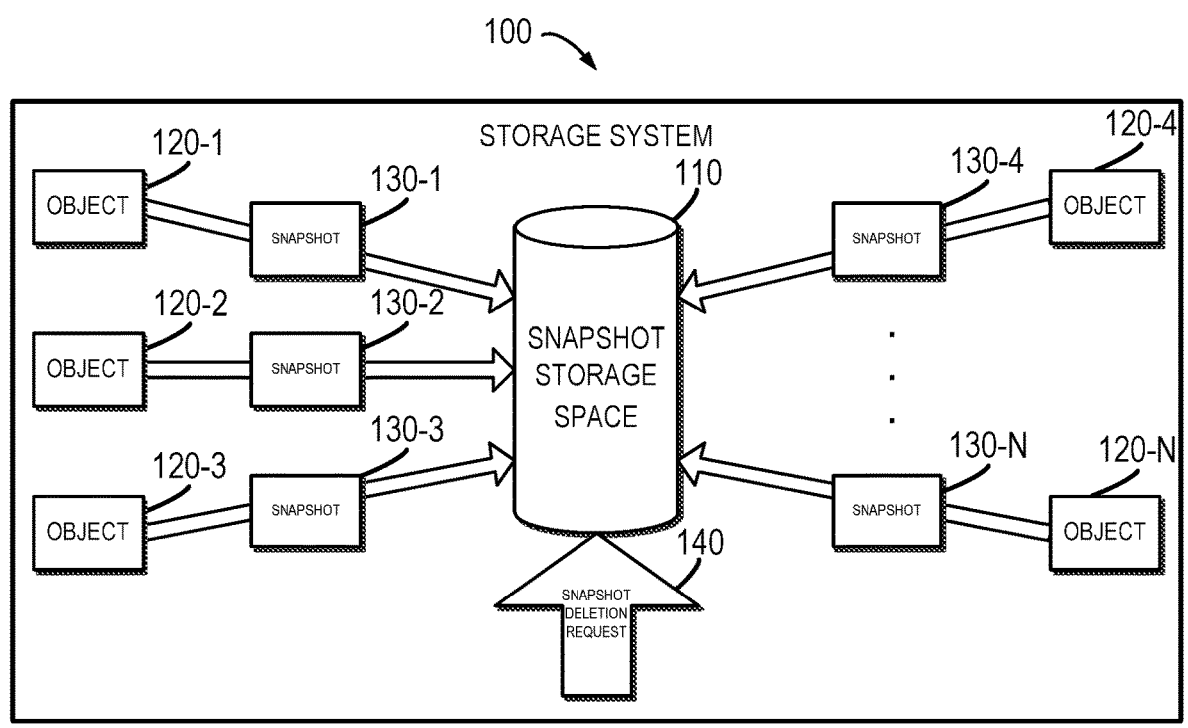
FIG. 1 shows a schematic view of a storage system 100 in a traditional solution.

FIG. 1 shows a schematic view of a storage system 100 in a traditional solution. Meanwhile, the storage system 100 as depicted is also applicable to embodiments of the present disclosure.

The storage system 100 may be, e.g. a distributed storage system. The storage system 100 as shown in FIG. 1 includes: a snapshot storage space 110, which may be used for store snapshots; N objects 120-1, 120-2, 120-3, 120-4 . . . 120-N (collectively referred to as object 120), which may include logical unit devices, file systems, data repositories, etc.; and snapshots 130-1, 130-2, 130-3, 130-4 . . . 130-N (collectively referred to as snapshot 130) which are generated for each of the objects 120, wherein multiple snapshots may be generated for each of the objects 120. As shown by an arrow starting from the object 120, going through the snapshot 130 and pointing to the snapshot storage space 110, the snapshot 130 generated for the object 120 is stored in the snapshot storage space 110. Meanwhile, as shown by an arrow of a snapshot deletion request 140 which points to the snapshot storage space 110, the snapshot deletion request 140 points to the snapshot storage space 110 and is used to delete the snapshot 130 stored in the snapshot storage space 110. According to embodiments of the present disclosure, the snapshot deletion request 140 may be initiated by a user or automatically generated by the system.

The snapshot deletion request 140 is usually stored in a snapshot deletion request list (or list) maintained by the storage system 100, the snapshot deletion request list being usually initialized when the storage system 100 is built or a snapshot deletion request is received. The current algorithm for snapshot deletion is first-come-first-process (FIFO), and the storage system 100 performs aggregate snapshot deletion once in a while. Usually, the first snapshot deletion request in the snapshot deletion request list is a current to-be-executed snapshot deletion request. Therefore, the current algorithm only focuses on the current to-be-executed snapshot deletion request in the snapshot deletion request list. During snapshot deletion, all snapshot deletion requests for the same object as the to-be-executed snapshot deletion request are processed in an aggregate way, snapshots associated with these snapshot deletion requests are deleted from the snapshot storage space 110, and these snapshot deletion requests are deleted from the snapshot deletion request list. Apparently, the current snapshot deletion algorithm fails to consider any snapshot deletion schedule, i.e. fails to consider which objects will generate snapshot deletion requests more frequently, in other words fails to consider the upcoming snap delete requests.

There are some special objects in the storage system 100, these objects having some special features, such as replication of an object and a snapshot schedule. Objects with such features will be created and delete snapshots more frequently than other objects. For example, each object in some object pairs needs to replicate its own data to the other object, so that data on the two objects are kept consistent. In this case, each object needs to first generate its own snapshot, then synchronizes with the object and finally deletes the generated snapshot. If synchronization is performed once every 10 minutes, then for this object pair, two snapshots will be generated and need to be deleted every 10 minutes. Therefore, for such objects, snapshot deletion requests will be generated quite frequently, and it may be considered postponing the execution of aggregate snapshot deletion requests for such objects, so that more snapshot deletion requests may be executed each time, and further the snapshot deletion efficiency of the whole storage system 100 may be improved. However, as described above, the current algorithm fails to process special objects with the above features differently.

Figure 2:
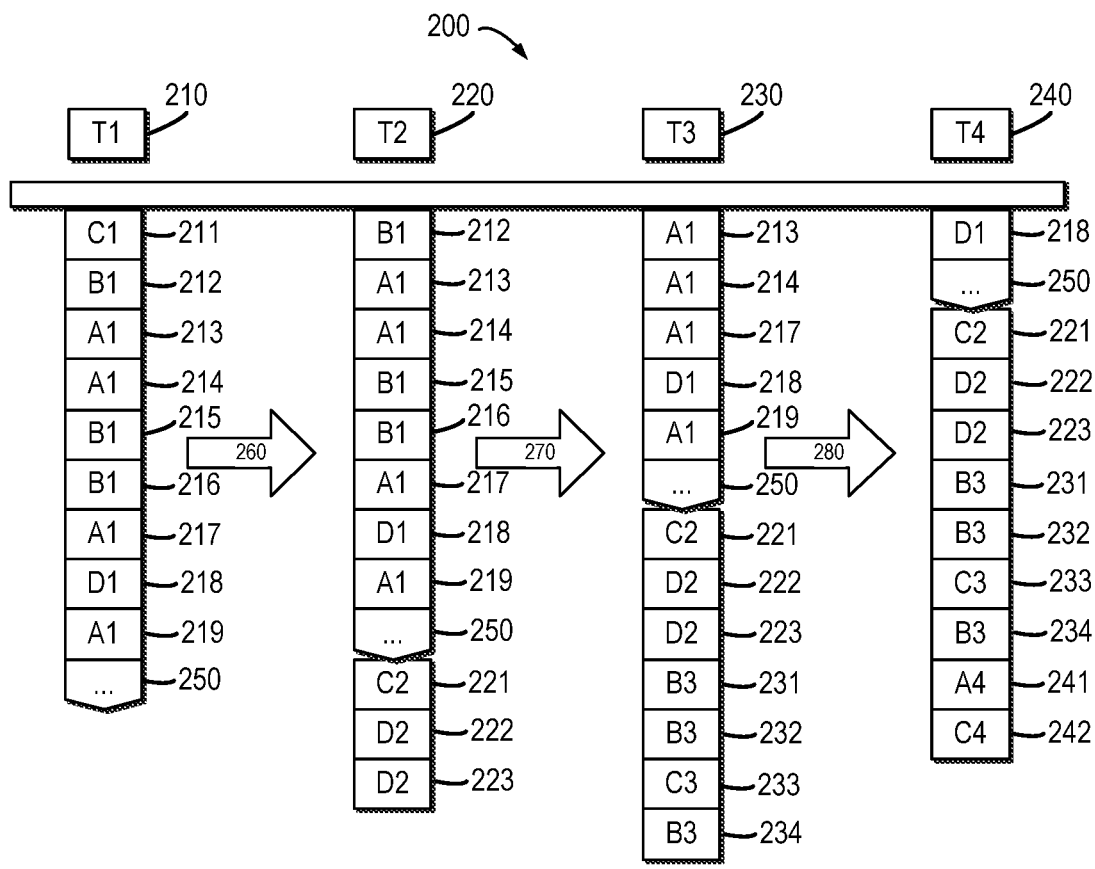
FIG. 2 shows a schematic view 200 of snapshot deletion over time in a traditional solution.

With reference to Table 1 and FIG. 2, illustration is presented below to traditional snapshot deletion operations over time. In the storage system 100, suppose there are four objects, i.e. object A, object B, object C, and object D. Among these four objects, object B and object C have a schedule feature, i.e. snapshot deletion requests will be generated more frequently for object B and object C. We define multiple time points T1, T2, T3 and T4 with equal intervals (e.g. by the unit of hours or minutes), wherein snapshot deletion requests which are generated for each object between each time point and the previous time point are as shown in Table 1 below.

TABLE 1

| Time Point | Num of snapshots generated for object A | Num of snapshots generated for object B | Num of snapshots generated for object C | Num of snapshots generated for object D |
|---|---|---|---|---|
| T1 | 4 | 3 | 1 | 1 |
| T2 | 0 | 0 | 1 | 2 |
| T3 | 0 | 3 | 1 | 0 |
| T4 | 1 | 0 | 1 | 0 |
| ... | ... | ... | ... | ... |

As shown in Table 1, at time point T1 (i.e. time period from 0 to T1), there are 4 snapshot deletion requests generated for object A, 3 snapshot deletion requests generated for object B, 1 snapshot deletion request generated for object C, and 1 snapshot deletion request generated for object D. At time point T2 (i.e. time period from T1 to T2), generated are 1 snapshot deletion request for object C and 2 snapshot deletion requests for object D, but none for A and B. At time point T3 (i.e. time period from T2 to T3), generated are 3 snapshot deletion requests for object B and 1 snapshot deletion request for object C, but none for A and D. At time point T4 (i.e. time period from T3 to T4), generated are 1 snapshot deletion request for object A and 1 snapshot deletion request for object C, but none for B and D.

FIG. 2 shows a schematic view 200 of snapshot deletion over time in traditional solutions in conjunction with Table 1. As shown in FIG. 2, the four time points are marked as T1 210, T2 220, T3 230 and T4 240 respectively, and below each time point is a snapshot deletion request list at this time point. For each item in the snapshot deletion request list, e.g. item "C1," "C" represents this snapshot deletion request is associated with object C, and "1" represents this snapshot deletion request is newly detected at time point "T1 210," i.e. generated in the time period from 0 to T1 210.

As shown in FIG. 2, at T1 210, in the snapshot deletion request list there are 9 snapshot deletion requests as shown in Table 1, i.e. 4 snapshot deletion requests (i.e. 213, 214, 217 and 219) for object A, 3 snapshot deletion requests (i.e. 212, 215 and 216) for object B, 1 snapshot deletion request (i.e. 211) for object C and 1 snapshot deletion request (i.e. 218) for object D. In the snapshot deletion request list, the snapshot deletion request 211 is the first snapshot deletion request in the snapshot deletion request list, i.e. a to-be-executed snapshot deletion request, and a mark 250 indicates the end of the snapshot deletion request list at T1 210.

An arrow 260 in FIG. 2 indicates snapshot deletion requests in the snapshot deletion request list are aggregated-executed. Since in the snapshot deletion request list at T1 210, the to-be-executed snapshot deletion request is the snapshot deletion request 211 for object C, all snapshot deletion requests associated with object C, i.e. the snapshot deletion request 211 in the snapshot deletion request list will be executed at 260, then the executed snapshot deletion request 211 will be deleted from the snapshot deletion request list, and finally an updated snapshot deletion request list will be obtained at T2 220.

At T2 220, it can be seen the snapshot deletion request 211 has been deleted from the snapshot deletion request list since being executed, and below the mark 250, 3 snapshot deletion requests which are newly generated in the time period from T1 210 to T2 220 are newly added to the snapshot deletion request list, the snapshot deletion request 221 for object C and the snapshot deletion requests 222, 223 for object D.

An arrow 270 in FIG. 2 also indicates snapshot deletion requests in the snapshot deletion request list are aggregated-executed. Since in the snapshot deletion request list at T2 220, the to-be-executed snapshot deletion request is the snapshot deletion request 212 for object B, all snapshot deletion requests associated with object B, i.e. the snapshot deletion requests 212, 215 and 216 in the snapshot deletion request list will be executed at 270, then the executed snapshot deletion requests 212, 215 and 216 will be deleted from the snapshot deletion request list, and finally an updated snapshot deletion request list will be obtained at T3 230.

At T3 230, it can be seen the snapshot deletion requests 212, 215 and 216 have been deleted from the snapshot deletion request list since being executed, and below the mark 250, 4 snapshot deletion requests which are newly generated in the time period from T2 220 to T3 230 are newly added to the snapshot deletion request list, i.e. the snapshot deletion requests 231, 232 and 234 for object B and the snapshot deletion request 233 for object C.

An arrow 280 in FIG. 2 also indicates snapshot deletion requests in the snapshot deletion request list are aggregated-executed. Since in the snapshot deletion request list at T3 230, the to-be-executed snapshot deletion request is the snapshot deletion request 213 for object A, all snapshot deletion requests associated with object A, i.e. the snapshot deletion requests 213, 214, 217 and 219 in the snapshot deletion request list will be executed at 280, then the executed snapshot deletion requests 213, 214, 217 and 219 will be deleted from the snapshot deletion request list, and finally an updated snapshot deletion request list will be obtained at T4 240.

At T4 240, it can be seen the snapshot deletion requests 213, 214, 217 and 219 have been deleted from the snapshot deletion request list since being executed, and below the mark 250, 2 snapshot deletion requests which are newly generated in the time period from T3 230 to T4 240 are newly added to the snapshot deletion request list, i.e. the snapshot deletion request 241 for object A and the snapshot deletion request 242 for object C.

As seen from comprehensive analysis of Table 1 and FIG. 2, a total of 18 snapshot deletion requests are generated in the time period from 0 to T4: 9 (T1)+3 (T2)+4 (T3)+2 (T4), while 10 snapshot deletion requests still remain at T4. That is, a total of 8 snapshot deletion requests are executed in the time period from 0 to T4. However, the above traditional snapshot deletion operations over time fail to differently process object B and object C that will generate snapshot deletion requests more frequently due to the schedule feature, so the storage system 100 is rather inefficient in executing snapshot deletion requests.

Traditional snapshot deletion operations over time have been described with reference to FIGS. 1 and 2, now detailed description is presented below to specific flows and operations of methods 300, 400 and 600 for snapshot deletion according to embodiments of the present disclosure by referring to FIGS. 3 to 5.

In order to at least partly eliminate the above problems in traditional solutions, embodiments of the present disclosure propose a method for snapshot deletion. The method takes into consideration objects that have a schedule feature and thus will generate snapshot deletion requests more frequently; so that aggregate snapshot deletion requests may be executed for such objects with higher aggregation efficiency and further the execution efficiency of snapshot deletion requests of the whole storage system 100 may be increased.

Figure 3:
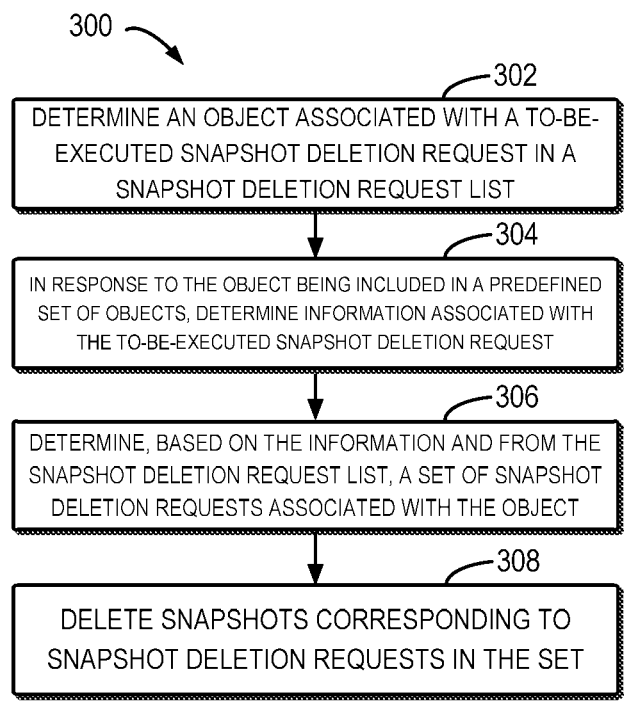
FIG. 3 shows a flowchart of a method 300 for snapshot deletion according to embodiments of the present disclosure.

FIG. 3 shows a flowchart of a method 300 for snapshot deletion according to embodiments of the present disclosure. Specifically, the method 300 may be performed by the storage system 100 or other appropriate device. It should be understood the method 300 may further include an additional step which is not shown and/or omit a step which is shown, and the scope of the present disclosure is not limited in this regard.

At block 302, the storage system 100 determines an object associated with a to-be-executed snapshot deletion request in a snapshot deletion request list of the storage system 100. According to embodiments of the present disclosure, the storage system 100 may maintain the snapshot deletion request list, wherein the first snapshot deletion request in the snapshot deletion request list may serve as the to-be-executed snapshot deletion request. According to embodiments of the present disclosure, the object may include a logical unit device, a file system, a data repository, etc.

At block 304, in response to the object determined at block 302 being included in a predefined set of objects, the storage system 100 determines information associated with the to-be-executed snapshot deletion request. According to embodiments of the present disclosure, the predefined set of objects includes a set of objects for which snapshot deletion requests will be generated more frequently, which objects may be objects with a replication or schedule feature. In the storage system 100, objects with a replication or schedule feature may be determined by users when building the storage system 100 or determined through coordination with the storage system 100 after building the storage system 100. According to embodiments of the present disclosure, a schedule flag may be set for an object with a replication or schedule feature, at which point the set of objects with a schedule flag forms the predefined set of objects.

According to embodiments of the present disclosure, the information associated with the to-be-executed snapshot deletion request includes at least one of: the number of snapshot deletion requests in the snapshot deletion request list which correspond to snapshots associated with the object, and a waiting time of the to-be-executed snapshot deletion request in the snapshot deletion request list. It should be understood determining the information serves a purpose of postponing the execution of aggregate snapshot deletion requests for snapshot associated with the object in the predefined set of objects, so that more snapshot deletion requests may be aggregated-executed. Regarding the number of the information, taking the snapshot deletion request list at T2 220 as an example, the to-be-executed snapshot deletion request at this point is the snapshot deletion request 212 for object B, so the number of snapshot deletion requests associated with snapshots for object B in the snapshot deletion request list is 3, i.e. the snapshot deletion requests 212, 215 and 216.

According to embodiments of the present disclosure, when the object determined at block 302 not being included in the predefined set of objects, this means the current to-be-executed snapshot deletion request is not associated with an object for which snapshot deletion requests will be frequently generated. At this point, the execution of the current to-be-executed snapshot deletion request does not need to be postponed, but all snapshot deletion requests for an object associated with the to-be-executed snapshot deletion request may be directly aggregated-executed in the same way as traditional solutions, which is not detailed here.

At block 306, the storage system 100 determines a set of snapshot deletion requests associated with the object determined at block 302 from the snapshot deletion request list based on the information determined at block 304, i.e. a set of current to-be-executed snapshot deletion requests. According to embodiments of the present disclosure, at block 306, different steps may be performed depending on different content of the information determined at block 304. Operations at block 306 will be described with reference to FIGS. 4 and 6 depending on whether the information determined at block 304 includes the number or the waiting time, respectively.

Figure 4:
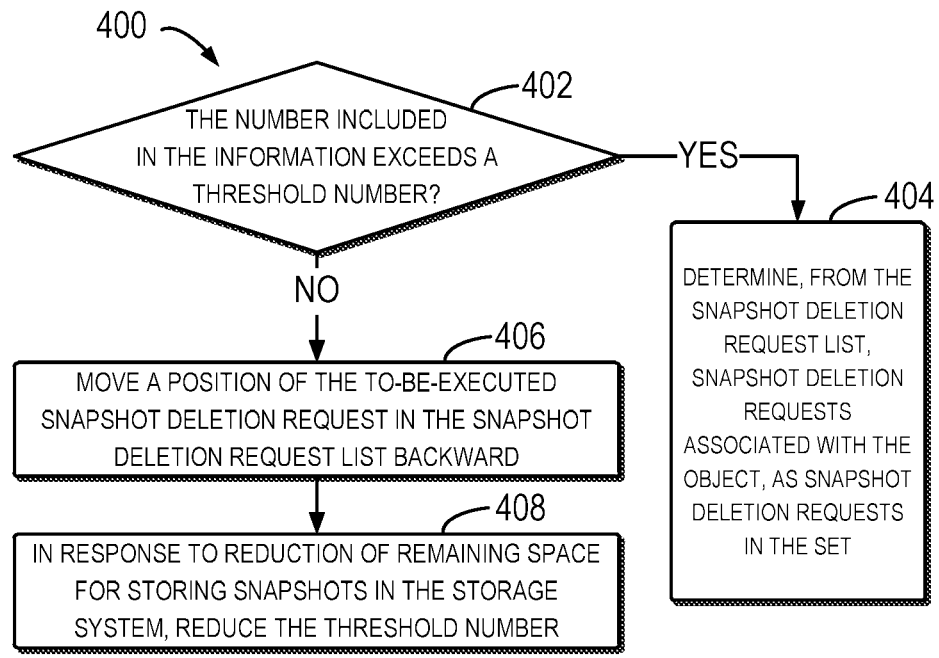
FIG. 4 shows a flowchart of a method 400 for snapshot deletion according to embodiments of the present disclosure.

FIG. 4 shows a flowchart of a method 300 for snapshot deletion according to embodiments of the present disclosure, which may be a refinement of operations at block 306 of the method 300 for snapshot deletion.

At block 402, the storage system 100 determines whether the number (the number of snapshot deletion requests in the snapshot deletion request list which correspond to snapshots associated with the object determined at block 302) included in the information determined at block 304 exceeds a threshold number. According to embodiments of the present disclosure, the threshold number is set for such a purpose that, regarding objects for which snapshot deletion requests will be generated more frequently, only when the number of snapshot deletion requests for snapshots associated with these objects meet a certain criterion, aggregate snapshot deletion requests will be executed, so that more snapshot deletion requests for these objects may be aggregated-executed, and further the execution efficiency of snapshot deletion requests of the storage system 100 may be improved. According to embodiments of the present disclosure, the threshold number may be set according to the generation frequency of snapshot deletion requests and the size of the snapshot storage space 110, which may be a couple, dozens or even more. For example, if there are 1000 objects in the storage system 100 and each object is configured to generate one snapshot and delete one snapshot every hour (i.e. for each object, one snapshot deletion request is generated every hour), then at this point the threshold number may be set to 50 or more. For example, if the snapshot storage space 110 is enough to store tens of thousands of snapshots, then at this point the threshold number may also be set to be larger.

When at block 402 the storage system 100 determines the number included in the information determined at block 304 exceeds the threshold number, the flow proceeds to block 404, or else to block 406.

At block 404, since the number included in the information determined at block 304 exceeds the threshold number, the storage system 100 determines from the snapshot deletion request list snapshot deletion requests associated with the object determined at block 302, as snapshot deletion requests in the set determined at block 306, i.e. snapshot deletion requests to be aggregated-executed.

At block 406, since the number included in the information determined at block 304 does not exceed the threshold number, the storage system 100 will not execute the current to-be-executed snapshot deletion request. Therefore, the storage system 100 moves a position of the to-be-executed snapshot deletion request in the snapshot deletion request list backward, just as shown in FIG. 5.

Figure 5:
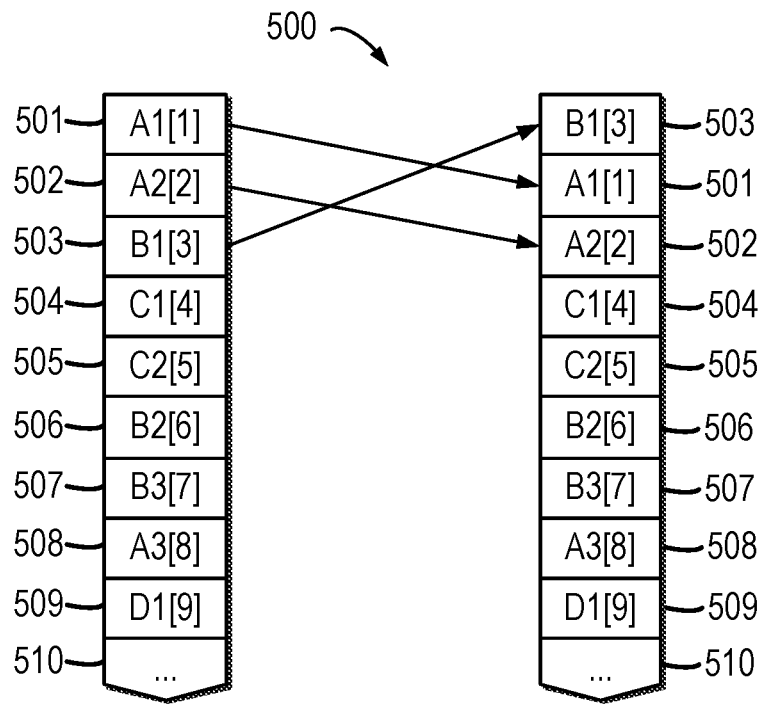
FIG. 5 shows a schematic view 500 of adjusting positions of snapshot deletion requests in a snapshot deletion request list according to embodiments of the present disclosure.

FIG. 5 shows a schematic view 500 of adjusting positions of snapshot deletion requests in a snapshot deletion request list according to embodiments of the present disclosure. As depicted, left of FIG. 5 is a current example snapshot deletion request list, and each item in the list is marked in the form of "A1[1]", wherein "A" represents this snapshot deletion request is associated with object A, numeral "1" represents this snapshot deletion request is which one of snapshot deletion requests for the same object in the list, and "[1]" represents this snapshot deletion request is which one of items in the list. Therefore, current snapshot deletion requests include the first snapshot deletion request 501 for object A as the first item in the snapshot deletion request list, the second snapshot deletion request 502 for object A as the second item in the snapshot deletion request list, the first snapshot deletion request 503 for object B as the third item in the snapshot deletion request list, the first snapshot deletion request 504 for object C as the fourth item in the snapshot deletion request list, the second snapshot deletion request 505 for object C as the fifth item in the snapshot deletion request list, the second snapshot deletion request 506 for object B as the sixth item in the snapshot deletion request list, the third snapshot deletion request 507 for object B as the seventh item in the snapshot deletion request list, the third snapshot deletion request 508 for object A as the eighth item in the snapshot deletion request list, as well as the first snapshot deletion request 509 for object D as the ninth item in the snapshot deletion request list. Meanwhile, a mark 510 indicates the end of the snapshot deletion request list.

Since the storage system 100 will not execute the current to-be-executed snapshot deletion request at block 406, the storage system 100 moves a position of the to-be-executed snapshot deletion request in the snapshot deletion request list backward, and a result of movement is as shown in the right of FIG. 5. Apparently the original position of the snapshot deletion request 501 is moved backward to the second place in the snapshot deletion request list. Meanwhile, since the snapshot deletion request 502 and the snapshot deletion request 501 are originally associated with object A and need to be subjected to the same operation, the original position of the snapshot deletion request 502 is moved backward to the third place in the snapshot deletion request list. The original snapshot deletion request 503 is associated with object B other than object A, so its position is moved forward to the first place in the snapshot deletion request list. At this point, the snapshot deletion request 503 becomes a new to-be-executed snapshot deletion request and thus is subjected to judgment regarding whether it is to be executed. Operations are the same as those at blocks 302 and 304 of the method 300 for snapshot deletion as described with reference to FIG. 3, which is not detailed here.

According to embodiments of the present disclosure, the distance that the storage device 100 moves the position of the to-be-executed snapshot deletion request in the snapshot deletion request list backward at block 406 can be determined according to specific information of the storage system 100. For example, when the storage system 100 executes aggregate snapshot deletion requests quite frequently, the to-be-executed snapshot deletion request may be moved farther backward at block 406, and vice versa. Since moving snapshot deletion requests in the snapshot deletion request list causes small computation overhead, it may be implemented frequently, until the storage system 100 can determine a to-be-executed snapshot deletion request which can be executed.

At block 408, in response to reduction of remaining space of the snapshot storage space 110 for storing the snapshots 130 in the storage system 100, the storage system 100 reduces the threshold number. According to embodiments of the present disclosure, the storage system 100 moves the position of the to-be-executed snapshot deletion request in the snapshot deletion request list backward at block 406, so that the execution of snapshot deletion requests associated with the object in the predefined set of objects is delayed. Therefore, more snapshots might be stored in the snapshot storage space 110. At this point, in order to avoid the system performance degradation due to too small available space in the snapshot storage space 110, the storage system 110 may reduce the threshold number to accelerate the execution of snapshot deletion requests associated with the object in the predefined set of objects, so that the snapshots 130 stored in the snapshot storage space 110 are caused to be deleted more quickly.

Figure 6:
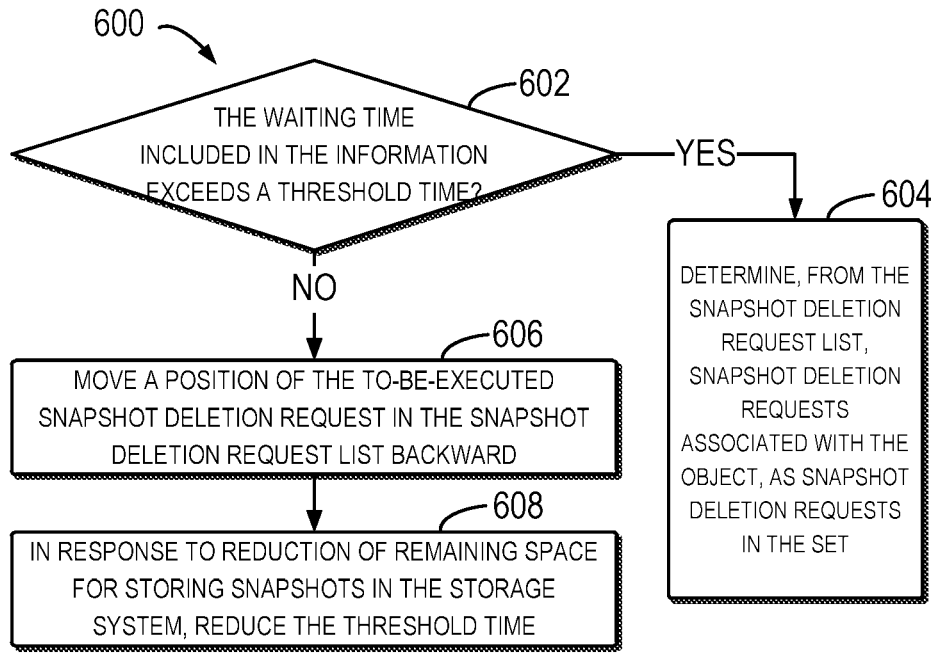
FIG. 6 shows a flowchart of a method for snapshot deletion according to embodiments of the present disclosure.

FIG. 6 shows a flowchart of a method 600 for snapshot deletion according to embodiments of the present disclosure, which may be a refinement of operations at block 306 of the method 300 for snapshot deletion.

At block 602, the storage system 100 determines whether the waiting time (waiting time of the to-be-executed snapshot deletion request in the snapshot deletion request list) included in the information determined at block 304 exceeds a threshold time. According to embodiments of the present disclosure, the threshold time is set for a purpose of preventing snapshot deletion requests associated with snapshots of objects, for which snapshot deletion requests will be generated more frequently, from waiting for a too long time in the snapshot deletion request list, thereby avoiding the impact on the response time of snapshot deletion requests associated with these objects and on the user experience of users of these objects. According to embodiments of the present disclosure, the threshold time may be set according to the generation frequency of snapshot deletion requests and the size of the snapshot storage space 110, which may be several hours, several days, etc.

When at block 602 the storage system 100 determines the waiting time included in the information determined at block 304 exceeds the threshold time, the flow proceeds to block 604, or else to block 606.

At block 604, since the waiting time included in the information determined at block 304 exceeds the threshold time, even if the number included in the information determined at block 304 does not exceed the threshold number, the storage system 100 determines from the snapshot deletion request list snapshot deletion requests associated with the object determined at block 302, as snapshot deletion requests in the set determined at block 306, i.e. snapshot deletion requests to be aggregated-executed.

At block 606, since the waiting time included in the information determined at block 304 does not exceed the threshold time, the storage system 100 will not execute the current to-be-executed snapshot deletion request. Therefore, the storage system 100 moves a position of the to-be-executed snapshot deletion request in the snapshot deletion request list backward, just as shown in FIG. 5. The operation at block 606 is similar to that at block 406 in FIG. 4, which is not detailed here.

At block 608, in response to reduction of remaining space of the snapshot storage space 110 for storing the snapshots 130 in the storage system 100, the storage system 100 reduces the threshold time. According to embodiments of the present disclosure, the storage system 100 moves the position of the to-be-executed snapshot deletion request in the snapshot deletion request list backward at block 606, so that the execution of snapshot deletion requests associated with the object in the predefined set of objects is delayed. Therefore, more snapshots might be stored in the snapshot storage space 110. At this point, in order to avoid the system performance degradation due to too small available space in the snapshot storage space 110, the storage system 110 may reduce the threshold time to accelerate the execution of snapshot deletion requests associated with the object in the predefined set of objects, so that the snapshots 130 stored in the snapshot storage space 110 are caused to be deleted more quickly.

Flowcharts of the methods 400 and 600 for snapshot deletion according to embodiments of the present disclosure have been described with reference to FIGS. 4 and 6, and they may be refinements of the operation at block 306 of the method 300 for snapshot deletion.

Returning to FIG. 3, at block 308, the storage system 100 deletes snapshots corresponding to snapshot deletion requests in the set based on the set of snapshot deletion requests determined at block 306. According to embodiments of the present disclosure, as the set of snapshot deletion requests to be executed currently is determined at block 306, these snapshot deletion requests are executed at block 308.

According to embodiments of the present disclosure, after deleting snapshots corresponding to snapshot deletion requests in the set determined at block 306, the storage system 100 may delete snapshot deletion requests in the set from the snapshot deletion request list and add a snapshot deletion request which is newly generated in the time period to the end of the snapshot deletion request list. Later, the process may return to block 302 to continue to determine an object associated with a current to-be-executed snapshot deletion request in the snapshot deletion request list of the storage system 100.

Flows of the methods 300, 400 and 600 for snapshot deletion have been described with reference to FIGS. 3 to 6. It should be understood the above description is for better presenting the content of the present disclosure rather than limiting in any manner.

Figure 7:
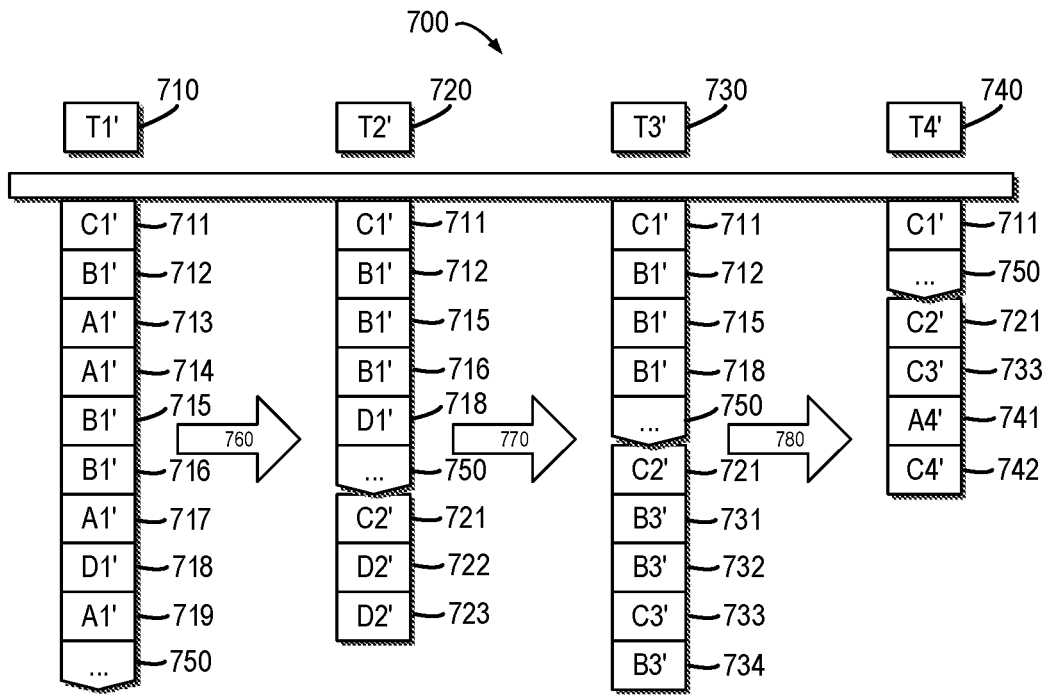
FIG. 7 shows a schematic view 700 of snapshot deletion over time according to embodiments of the present disclosure.

FIG. 7 shows a schematic view 700 of snapshot deletion over time according to embodiments of the present disclosure. FIG. 7 may be described with reference to data in Table 1. That is, in the storage system 100, suppose there are four objects, i.e. object A, object B, object C and object D. Among these four objects, object B and object C have a schedule feature, i.e. snapshot deletion requests will be generated more frequently for object B and object C. At time point T1' (i.e. time period from 0 to T1'), there are 4 snapshot deletion requests generated for object A, 3 snapshot deletion requests generated for object B, 1 snapshot deletion request generated for object C, and 1 snapshot deletion request generated for object D. At time point T2' (i.e. time period from T1' to T2'), generated are 1 snapshot deletion request for object C and 2 snapshot deletion requests for object D, but none for A and B. At time point T3' (i.e. time period from T2' to T3'), generated are 3 snapshot deletion requests for object B and 1 snapshot deletion request for object C, but none for A and D. At time point T4' (i.e. time period from T3' to T4'), generated are 1 snapshot deletion request for object A and 1 snapshot deletion request for object C, but none for B and D.

As shown in FIG. 7, the four time points are marked as T1' 710, T2' 720, T3' 730 and T4' 7240 respectively, and below each time point is a snapshot deletion request list at this time point. For each item in the snapshot deletion request list, e.g. item "C1," "C" represents this snapshot deletion request is associated with object C, and "1" represents this snapshot deletion request is newly detected at time point "T1' 710," i.e. generated in the time period from 0 to T1' 710.

The snapshot deletion over time as shown in FIG. 7 adopts the methods 300 and 400 for snapshot deletion as described with reference to FIGS. 3 and 4 but fails to consider the method 600 for snapshot deletion described with reference to FIG. 6, i.e. fails to consider the waiting time of the to-be-executed snapshot deletion request in the snapshot deletion request list. Meanwhile, in the snapshot deletion over time as shown in FIG. 7, the threshold number is set to 6, i.e. execution will be implemented only when the number of snapshot deletion requests associated with object B and object C in the snapshot deletion request list amounts to 6.

As shown in FIG. 7, at T1' 710, in the snapshot deletion request list there are 9 snapshot deletion requests as shown in Table 1, i.e. 4 snapshot deletion requests (i.e. 713, 714, 717 and 719) for object A, 3 snapshot deletion requests (i.e. 712, 715 and 716) for object B, 1 snapshot deletion request (i.e. 711) for object C and 1 snapshot deletion request (i.e. 718) for object D. In the snapshot deletion request list, the snapshot deletion request 711 is the first snapshot deletion request in the snapshot deletion request list, i.e. a to-be-executed snapshot deletion request, and a mark 750 indicates the end of the snapshot deletion request list at T1' 710.

An arrow 760 in FIG. 7 indicates snapshot deletion requests in the snapshot deletion request list are aggregated-executed. In the snapshot deletion request list at T1' 710, although the first in the snapshot deletion request list is the snapshot deletion request 711 for object C, since object C is included in the predefined set of objects, and there is only 1 snapshot deletion request associated with object C in the list (not reaching the threshold 6), the snapshot deletion request 711 is not executed. Further, the second in the snapshot deletion request list is the snapshot deletion request 712 for object B, whereas object B is included in the predefined set of objects and there are only 3 snapshot deletion requests associated with object B in the list (not reaching the threshold 6), so the snapshot deletion request 712 is also not executed. Continuing the snapshot deletion request list, the third in the list is the snapshot deletion request 713 for object A. Although there are only 4 snapshot deletion requests associated with object A in the list, since object A not being included in the predefined set of objects, at this point the snapshot deletion request 713 is regarded as the to-be-executed snapshot deletion request and executed, i.e. all snapshot deletion requests, including the snapshot deletion requests 713, 714, 717 and 719 associated with object A in the list are aggregated-executed, then these executed snapshot deletion requests will be deleted from the snapshot deletion request list, and finally an updated snapshot deletion request list will be obtained at time point T2' 720.

At T2' 720, it can be seen the snapshot deletion requests 713, 714, 717 and 719 have been deleted from the snapshot deletion request list since being executed, and below the mark 750, 3 snapshot deletion requests which are newly generated in the time period from T1' 710 to T2' 720 are newly added to the snapshot deletion request list, i.e. the snapshot deletion request 711 for object C and the snapshot deletion requests 722, 723 for object D.

An arrow 770 in FIG. 7 also indicates snapshot deletion requests in the snapshot deletion request list are aggregated-executed. Since in the snapshot deletion request list at T2' 720, although the first in the snapshot deletion request list is the snapshot deletion request 711 for object C, since object C is included in the predefined set of objects, and there is only 2 snapshot deletion requests associated with object C in the list (not reaching the threshold 6), the snapshot deletion request 711 is not executed. Further, the second, the third and the fourth in the snapshot deletion request list are the snapshot deletion requests 712, 715 and 716 for object B respectively, whereas object B is included in the predefined set of objects and there are only 3 snapshot deletion requests associated with object B in the list (not reaching the threshold 6), so the snapshot deletion requests 712, 715 and 716 are also not executed. Continuing the snapshot deletion request list, the fifth in the list is the snapshot deletion request 718 for object D. Although there are only 3 snapshot deletion requests associated with object D in the list, since object D not being included in the predefined set of objects, at this point the snapshot deletion request 718 is regarded as the to-be-executed snapshot deletion request and executed, i.e. all snapshot deletion requests, including the snapshot deletion requests 718, 722 and 723 associated with object D in the list are aggregated-executed, then these executed snapshot deletion requests will be deleted from the snapshot deletion request list, and finally an updated snapshot deletion request list will be obtained at time point T3' 730.

At T3' 730, it can be seen the snapshot deletion requests 718, 722 and 723 have been deleted from the snapshot deletion request list since being executed, and below the mark 750, 4 snapshot deletion requests which are newly generated in the time period from T2' 720 to T3' 730 are newly added to the snapshot deletion request list, i.e. the snapshot deletion requests 731, 732 and 734 for object B and the snapshot deletion request 733 for object C.

An arrow 780 in FIG. 7 also indicates snapshot deletion requests in the snapshot deletion request list are aggregated-executed. Since in the snapshot deletion request list at T3' 730, although the first in the snapshot deletion request list is the snapshot deletion request 711 for object C, since object C is included in the predefined set of objects, and there is only 3 snapshot deletion requests associated with object C in the list (not reaching the threshold 6), the snapshot deletion request 711 is not executed. Further, the second in the snapshot deletion request list is the snapshot deletion request 712 for object B respectively, whereas object B is included in the predefined set of objects and there are 6 snapshot deletion requests associated with object B in the list (reaching the threshold 6), so the snapshot deletion request 712 is regarded as the to-be-executed snapshot deletion request and executed, i.e. all snapshot deletion requests, including the snapshot deletion requests 712, 715, 718, 731, 732 and 734 associated with object B in the list are aggregated-executed, then these executed snapshot deletion requests will be deleted from the snapshot deletion request list, and finally an updated snapshot deletion request list will be obtained at time point T4' 740.

At T4' 740, it can be seen the snapshot deletion requests 712, 715, 718, 731, 732 and 734 have been deleted from the snapshot deletion request list since being executed, and below the mark 750, 2 snapshot deletion requests which are newly generated in the time period from T3' 730 to T4' 740 are newly added to the snapshot deletion request list, i.e. the snapshot deletion request 741 for object A and the snapshot deletion request 742 for object C.

As seen from comprehensive analysis of Table 1 and FIG. 7, a total of 18 snapshot deletion requests are generated in the time period from 0 to T4': 9 (T1')+3 (T2')+4 (T3')+2 (T4'), while 5 snapshot deletion requests still remain at T4'. That is, a total of 13 snapshot deletion requests are executed in the time period from 0 to T4'. In comparison, in snapshot deletion over time in traditional solutions as described with reference to FIG. 2, 10 snapshot deletion requests remain, i.e. a total of 8 snapshot deletion requests are executed in the time period from 0 to T4'. Therefore, with the method according to embodiments of the present disclosure, more snapshots 120 stored in the snapshot storage space 110 may be deleted in the same time period, so that the efficiency of snapshot deletion operations may be improved significantly.

According to embodiments of the present disclosure, in the storage system 100, as the proportion of the objects 120 with a schedule feature increases, the number of snapshot deletion requests executed in the same time period will be increased too. With reference to Table 2, illustration is presented to the percentage by which the number of snapshot deletion requests executed in the same time period is increased, when the proportion of the objects 120 with a schedule feature in the storage system 100 reaches a certain percentage.

TABLE 2

| Percentage of objects 120 with schedule feature | [(the number of snapshot deletion requests executed with the method of embodiments of the present disclosure/ the number of snapshot deletion requests executed with the traditional method) − 1]100% |
|---|---|
| 90% | 23.39% |
| 70& | 17.02% |
| 50% | 12.29% |
| 30% | 8.31% |
| 0% | 0% |

The test result in Table 2 above is derived from data, including a total 1000 objects 120 in the storage system 100, 0-5 snapshots associated with each object which may be generated at each time point, and a total time duration 0-T1000. It can be seen in the long-term use, with the method according to embodiments of the present disclosure, more snapshots 120 stored in the snapshot storage space 110 can be deleted during the same time period, so that the efficiency of snapshot deletion operations can be increased significantly.

As seen from the above description with reference to FIGS. 1 to 7, the technical solution according to embodiments of the present disclosure has many advantages over the traditional solution. First of all, the computation of the technical solution according to embodiments of the present disclosure is not complex and easy to implement. In addition, experiment data show with the technical solution according to embodiments of the present disclosure, the execution efficiency of snapshot deletion requests in the storage system 100 may be increased significantly, i.e. the performance of snapshot deletion operations may be improved. Moreover, the technical solution according to embodiments of the present disclosure will not affect other service on the storage system 100, because it may adaptively add and modify some thresholds to improve the current snapshot deletion algorithm. Finally, the technical solution according to embodiments of the present disclosure is user-friendly since it does not need other interaction with users in the implementation process.

Figure 8:
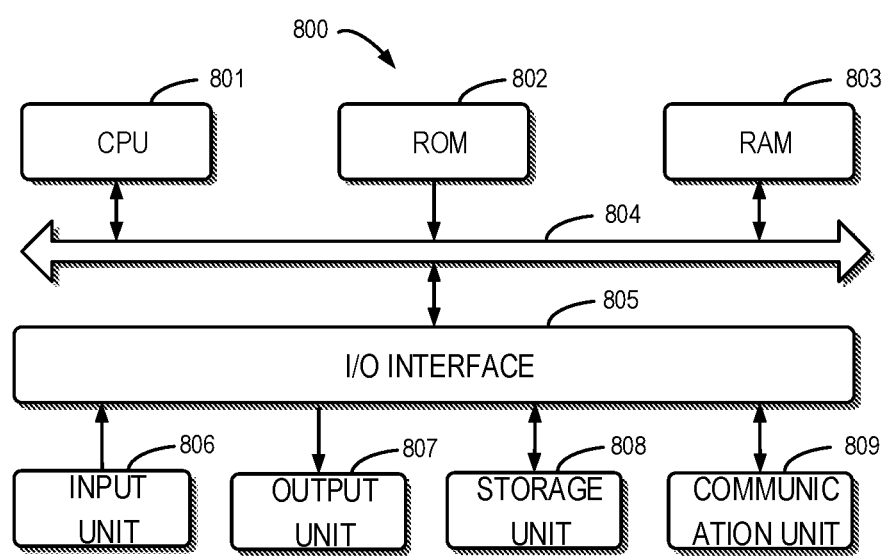
FIG. 8 shows a schematic block diagram of an example device 800 which is applicable to implement embodiments of the present disclosure.

FIG. 8 shows a schematic block diagram of an example device 800 suitable for implementing embodiments of the present disclosure. As depicted, the device 800 includes a central processing unit (CPU) 801 which is capable of performing various appropriate actions and processes in accordance with computer program instructions stored in a read only memory (ROM) 802 or computer program instructions loaded from a storage unit 608 to a random access memory (RAM) 803. In the RAM 803, there are also stored various programs and data required by the device 800 when operating. The CPU 801, the ROM 802 and the RAM 803 are connected to one another via a bus 804. An input/output (I/O) interface 805 is also connected to the bus 804.

Multiple components in the device 800 are connected to the I/O interface 805: an input unit 806 including a keyboard, a mouse, or the like; an output unit 807, such as various types of displays, a loudspeaker or the like; a storage unit 808, such as a disk, an optical disk or the like; and a communication unit 809, such as a LAN card, a modem, a wireless communication transceiver or the like. The communication unit 809 allows the device 800 to exchange information/data with other device via a computer network, such as the Internet, and/or various telecommunication networks.

The above-described procedures and processes (such as the methods 300, 400 and 600) may be executed by the processing unit 801. For example, in some embodiments, the methods 300, 400 and 600 may be implemented as a computer software program, which is tangibly embodied on a machine readable medium, e.g. the storage unit 808. In some embodiments, part or the entirety of the computer program may be loaded to and/or installed on the device 800 via the ROM 802 and/or the communication unit 809. The computer program, when loaded to the RAM 803 and executed by the CPU 801, may execute one or more acts of the methods 300, 400 and 600 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means (e.g., specialized circuitry) for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method of managing snapshots, comprising:
   generating snapshots of a plurality of objects of a storage system;
   determining an object, of the plurality of objects, associated with a to-be-executed snapshot deletion request in a snapshot deletion request list of the storage system;
   in response to the object being included in a predefined set of objects, monitoring the snapshot deletion request list to determine information associated with the to-be-executed snapshot deletion request, the information comprising at least one of: a number of snapshot deletion requests in the snapshot deletion request list which correspond to snapshots associated with the object, and a waiting time of the to-be-executed snapshot deletion request in the snapshot deletion request list;
   determining, based on the information and from the snapshot deletion request list, a set of snapshot deletion requests associated with the object; and
   deleting snapshots corresponding to snapshot deletion requests in the set.

2. The method according to claim 1, wherein determining the set comprises:
   in response to the number included in the information exceeding a threshold number, determining, from the snapshot deletion request list, snapshot deletion requests associated with the object, as snapshot deletion requests in the set.

3. The method according to claim 1, further comprising:
   in response to the number included in the information not exceeding the threshold number, moving a position of the to-be-executed snapshot deletion request in the snapshot deletion request list backward.

4. The method according to claim 3, further comprising:
   in response to reduction of remaining storage space in the storage system for storing snapshots, reducing the threshold number.

5. The method according to claim 1, wherein determining the set comprises:
   in response to the waiting time included in the information exceeding a threshold time, determining, from the snapshot deletion request list, snapshot deletion requests associated with the object, as snapshot deletion requests in the set.

6. The method according to claim 1, further comprising:
   in response to the waiting time included in the information not exceeding the threshold time, moving a position of the to-be-executed snapshot deletion request in the snapshot deletion request list backward.

7. The method according to claim 6, further comprising:
   in response to reduction of remaining storage space for storing snapshots in the storage system, reducing the threshold time.

8. The method according to claim 1, wherein the object comprises at least one of: a logical unit device, a file system, and a data repository.

9. A device for managing snapshots, comprising:
   at least one processing unit;
   at least one memory coupled to the at least one processing unit and storing instructions to be executed by the at least one processing unit, the instructions, when being executed by the at least one processing unit, causing the device to perform acts comprising:
   generating snapshots of a plurality of objects of a storage system;
   determining an object, of the plurality of objects, associated with a to-be-executed snapshot deletion request in a snapshot deletion request list of the storage system;
   in response to the object being included in a predefined set of objects, monitoring the snapshot deletion request list to determine information associated with the to-be-executed snapshot deletion request, the information comprising at least one of: a number of snapshot deletion requests in the snapshot deletion request list which correspond to snapshots associated with the object, and a waiting time of the to-be-executed snapshot deletion request in the snapshot deletion request list;
   determining, based on the information and from the snapshot deletion request list, a set of snapshot deletion requests associated with the object; and
   deleting snapshots corresponding to snapshot deletion requests in the set.

10. The device according to claim 9, wherein determining the set comprises:
    in response to the number included in the information exceeding a threshold number, determining, from the snapshot deletion request list, snapshot deletion requests associated with the object, as snapshot deletion requests in the set.

11. The device according to claim 9, wherein the acts further comprise:
    in response to the number included in the information not exceeding the threshold number, moving a position of the to-be-executed snapshot deletion request in the snapshot deletion request list backward.

12. The device according to claim 11, wherein the acts further comprise:

in response to reduction of remaining storage space in the storage system for storing snapshots, reducing the threshold number.

13. The device according to claim 9, wherein determining the set comprises:
in response to the waiting time included in the information exceeding a threshold time, determining, from the snapshot deletion request list, snapshot deletion requests associated with the object, as snapshot deletion requests in the set.

14. The device according to claim 9, wherein the acts further comprise:
in response to the waiting time included in the information not exceeding the threshold time, moving a position of the to-be-executed snapshot deletion request in the snapshot deletion request list backward.

15. The device according to claim 14, wherein the acts further comprise:
in response to reduction of remaining storage space for storing snapshots in the storage system, reducing the threshold time.

16. The device according to claim 9, wherein the object comprises at least one of: a logical unit device, a file system, and a data repository.

17. A computer program product having a non-transitory computer readable medium which stores a set of instructions to manage snapshots; the set of instructions, when carried out by computerized circuitry, causing the computerized circuitry to perform a method of:
generating snapshots of a plurality of objects of a storage system;
determining an object, of the plurality of objects, associated with a to-be-executed snapshot deletion request in a snapshot deletion request list of the storage system;
in response to the object being included in a predefined set of objects, monitoring the snapshot deletion request list to determine information associated with the to-be-executed snapshot deletion request, the information comprising at least one of: a number of snapshot deletion requests in the snapshot deletion request list which correspond to snapshots associated with the object, and a waiting time of the to-be-executed snapshot deletion request in the snapshot deletion request list;
determining, based on the information and from the snapshot deletion request list, a set of snapshot deletion requests associated with the object; and
deleting snapshots corresponding to snapshot deletion requests in the set.

18. The computer program product according to claim 17, wherein determining the set comprises:
in response to the number included in the information exceeding a threshold number, determining, from the snapshot deletion request list, snapshot deletion requests associated with the object, as snapshot deletion requests in the set.

19. The computer program product according to claim 17, further comprising:
in response to the number included in the information not exceeding the threshold number, moving a position of the to-be-executed snapshot deletion request in the snapshot deletion request list backward.

20. The computer program product according to claim 17, wherein determining the set comprises:
in response to the waiting time included in the information exceeding a threshold time, determining, from the snapshot deletion request list, snapshot deletion requests associated with the object, as snapshot deletion requests in the set.

* * * * *